United States Patent [19]

Cerroni

[11] Patent Number: 4,460,131
[45] Date of Patent: Jul. 17, 1984

[54] RECOVERY OF CARDBOARDS FROM THE COMMERCIAL WASTE

[76] Inventor: Manlio Cerroni, Via Bruxelles, 53, 00198 Roma, Italy

[21] Appl. No.: 465,758

[22] Filed: Feb. 11, 1983

Related U.S. Application Data

[62] Division of Ser. No. 199,592, Oct. 22, 1980, abandoned.

[30] Foreign Application Priority Data

Oct. 23, 1979 [IT] Italy .................... 50648 A/79

[51] Int. Cl.³ .............................................. B02C 19/12
[52] U.S. Cl. ........................................ 241/19; 241/24; 241/DIG. 38
[58] Field of Search .................... 241/24, 77, 19, 79.1, 241/81, 65, DIG. 38, 21

[56] References Cited

U.S. PATENT DOCUMENTS 3,736,120 5/1973 Tempe .................... 241/DIG. 38 X
4,098,464 7/1978 Niedner et al. ........ 241/DIG. 38 X Primary Examiner—Mark Rosenbaum
Attorney, Agent, or Firm—Laurence R. Brown

[57] ABSTRACT

Commercial waste having cardboard mixed with paper, plastic film, organic materials and other contaminants is processed through a critical sequence of operations, namely: removal of bulky materials, feeding at a selected rate, separating small contaminants, separating ferrous materials, diverting non-ferrous contaminants triterating, screening out small contaminants, separating preferably by air the cardboard, and pressing and packaging the recovered cardboard.

4 Claims, 1 Drawing Figure

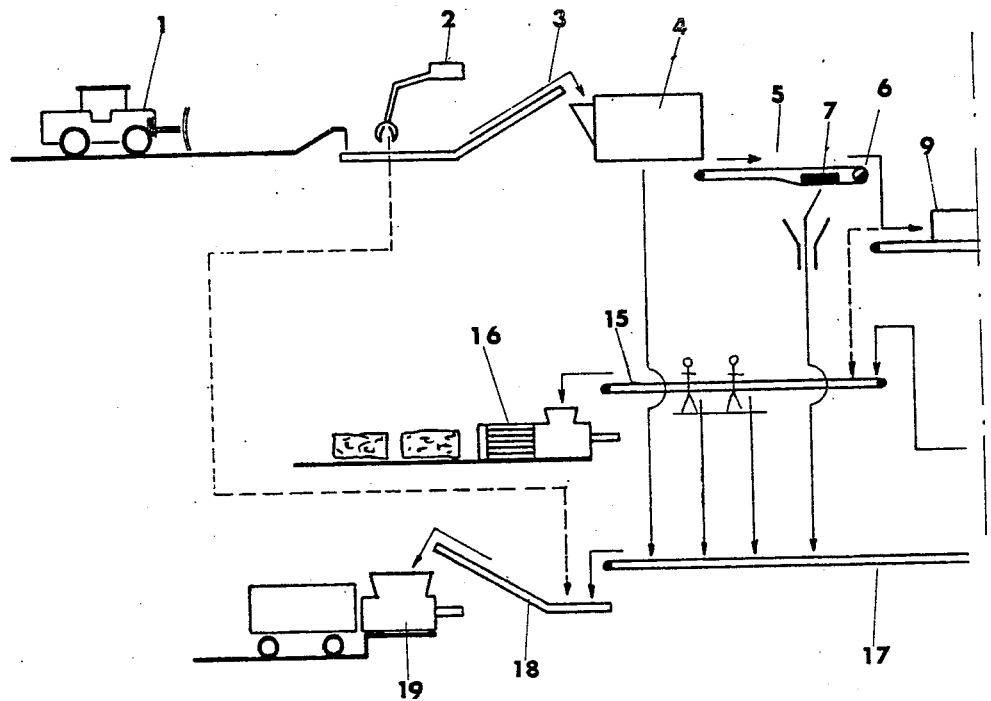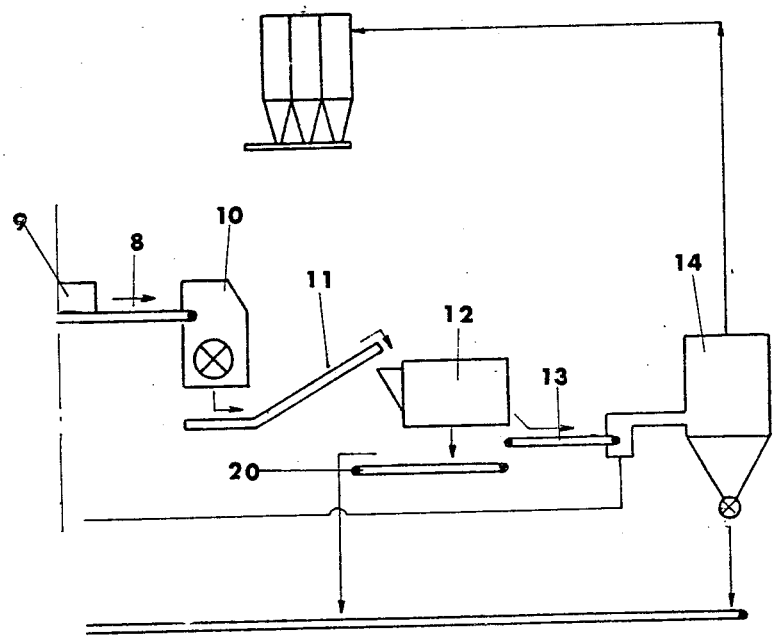

RECOVERY OF CARDBOARDS FROM THE COMMERCIAL WASTE

This is a divisional of Ser. No. 199,592 filed Oct. 22, 1980, now abandoned.

BACKGROUND OF INVENTION

It is known that commercial waste includes materials having a remarkable interest, so that their recovery appears to be justified. These materials are generally composed of cardboards, paper, plastic in film, and lower percentages of organic materials, ferrous materials, non-ferrous materials and contaminating substances of various type.

It is known as well that cardboard represents one of the more interesting materials among those which one could desire to reclaim from the bulk of all this waste.

Obviously, the separation of cardboard from the solid waste containing it, is already effected, but the means which are employed in order to effect such sorting are generally not-sufficient to this end, and the need is felt of having recourse to further and more improved means, such to permit a larger (in percentage) recovery of the cardboard which is contained in such waste.

SUMMARY OF INVENTION

An object of the present invention is a plant in which successive stations are foreseen, at which the material being treated undergoes predetermined operations. The characteristic of this invention is the adoption of this particular sequence of stations, this sequence giving results which are unexpected and remarkably better than those achieved by the techniques which until now have been employed. In other words, by the utilizing of the sequence of stations with the corresponding workings which take place at each of them, a recovered, finished product of cardboard is achieved which is of a particularly high quality and, in particular, is essentially free of contaminating substances of any kind.

According to the invention, the plant is substantially and basically constituted in sequence, by a device drawing particularly bulky, foreign materials from the whole of the material in course of treatment, by a separator in which the various materials, and particularly the small-sized materials, are separated from the large-sized materials which are substantially formed of cardboards; a device separating ferrous or iron materials; an indicating-diverting device for the non-ferrous materials; a triturating device which effects the trituration or mincing of all the material in order to reduce it into parts of a suitable size; a separating screen adapted to remove from the cardboard the residues which possibly have not yet been separated at the primary screen; a classifier, preferably of the air-type, separating the lighter portions, formed by paper and plastic, from the fragmented cardboard; and a packing press.

The plant will be better understood from the following description, which is to be referred to the enclosed drawing, in which the plant itself is shown in a schematic way.

DESCRIPTION

As one can see from the drawing, a suitable means at the station 1 moves of the material to be treated, substantially formed of the commercial waste composed of cardboard, paper, plastic in film shape, with lesser percentages of organic materials, ferrous materials, non-ferrous materials and contaminating (polluting) substances of other type, toward a station 2, where, by means of any suitable mechanical apparatus, preferably hand-controlled, the possible, foreign, particularly bulky materials are picked up. Then, the material, from the station 2, through a dosing feeder 3, represented preferably by a conveying device of the metal-plates type, is transferred to a separator 4, in which the small-sized material is separated, which is prevailingly represented by substances contaminating the cardboard, as for instance organic materials, paper, iron, stiff plastic, and so on. From the separator, therefore, a material comes out, which, already by itself, is substantially composed of cardboard and contaminating substances of a ferrous type. The contaminating substances constituted by ferrous materials are separated at the station 5 by means of electromagnets 6, 7. Hence, by means of a conveyor belt, the materials, freed of the ferrous contaminating materials, are brought to a detector device 9 for the non-ferrous metal bodies, which acts while the material, arriving from the conveyor belt 5, is brought to a triturating device 10. As said, the transportation of the material takes place through a suitable conveyor belt 8, which reverses automatically its direction of movement in order to dump from the back side the portion of material containing the metal object.

Once a material has been obtained which is substantially freed of the small-sized contaminating materials, both ferrous and non-ferrous, the triturated material from triturator 10, through a conveyor belt 11, is conveyed to a separating screen 12 to the end of removing the organic material residues which possibly have not yet been eliminated in the primary screen 4, for instance because they were trapped within plastic bags. Obviously, these plastic bags undergo breaking during the trituration (mincing) step.

The material coming out the screen 12, formed by cardboard, paper and plastic in film, is brought, through the action of the conveyor belt 13, to a classifier, preferably a classifier of the air-type, 14, within which the light material undergoes removal, while the heavy material is discharged and conveyed to a further conveyor belt 15, at which place a control is effected, for instance by means of operators, on the efficiency of the separation step. On such belt, the possibly still remaining residues of non ferrous metals are disposed of. From the controlling station at 15, the material, composed substantially and exclusively of cardboard pieces having a suitable size, is conveyed to a press 16 for the packing step, whereas the waste coming from the separator 2 of large-sized materials, from the primary screen 4, from the separator 5 of the ferrous materials and from the separators 8 and 9 of the non-ferrous materials, from the secondary screen 12, from the air classifier 14, is brought, through a set of belt conveyors, or other conveying means 17, 18, to a compacting device 19, and from here it is forwarded to further destinations.

As can be deduced from the preceding description, the sequence of the stations has a fundamental import in order to achieve, starting from relatively heterogeneous and cardboard-containing material, a material which will be composed, in a substantially total way, of cardboard, and a waste material containing all the other resides which are usually associated with the commercial waste.

According to the inventive concept, essential is the said sequence of stations, in which plants and/or machinery will operate which are of a type per se known and meeting the purpose. That is, the invention doesn't refer to the particular employed machines, but to the sequence of stations in which, as said, machines will be employed, always under the supervision of human operators.

I claim:

1. The method for reclaiming cardboard essentially free of contaminating substances of any kind from commercial waste containing a high percentage of cardboard mixed with paper, plastic film, organic material, ferrous and non-ferrous metal contaminants and with other contaminating substances including organic materials, comprising treating a flow of the commercial waste through a flow path providing the critical ordered sequence of (a) removing bulky non-cardboard contaminants from the flow path of the commercial waste, (b) separating small-size materials from the commercial waste to pass the commercial waste composed substantially of cardboard along the flow path, (c) separating ferrous metals from the commercial waste, (d) mincing the remaining commercial waste in the flow path, (e) screening the minced waste to remove coarser materials from finer organic residue materials, and (f) separating from the coarser materials the lighter paper and plastic materials by classification means preferably of the air flow type.

2. The method defined in claim 1 wherein step (a) comprises, removing separately by a manually controlled mechanism the largest bulky contaminants, dose feeding the commercial waste at a controlled rate into a size separator, and separating out of the commercial waste small sized contaminants.

3. The method of claim 1 wherein further steps are sequenced between steps (c) and (d) comprising the steps of conveying the commercial waste along the flow path on a reversible conveyor belt, detecting non-ferrous metal bodies on said conveyor belt, and temporarily reversing the conveyor belt upon detection of the non-ferrous metal bodies to discharge them from the flow path.

4. The method of claim 1 including a further screening step after step (f) to remove finer materials from the commercial waste after materials are broken up by the mincing step.

* * * * *